(No Model.)
3 Sheets—Sheet 1.
G. REHFUSS.
MACHINE FOR SHAPING AND CURLING HATS.
No. 319,747. Patented June 9, 1885.
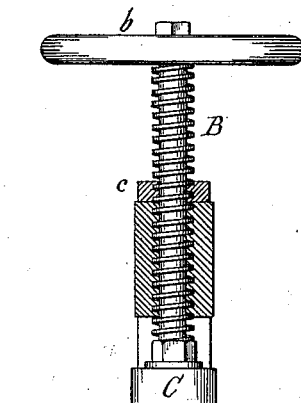
FIG. 1.
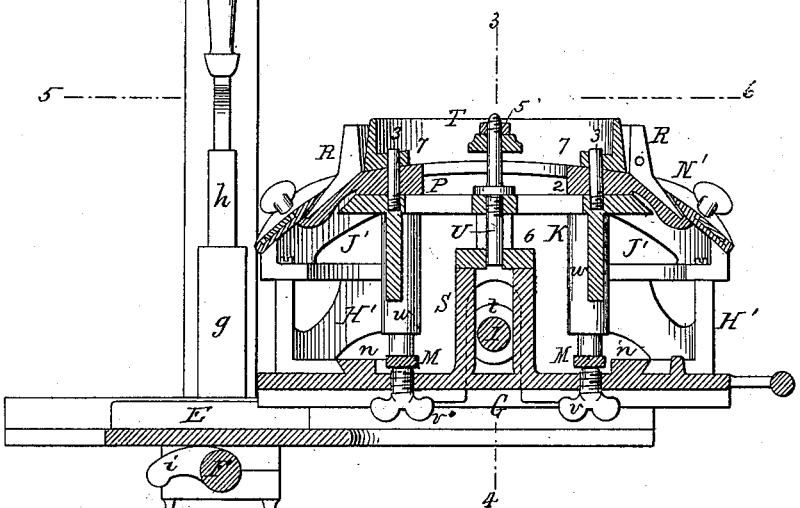
FIG. 2.
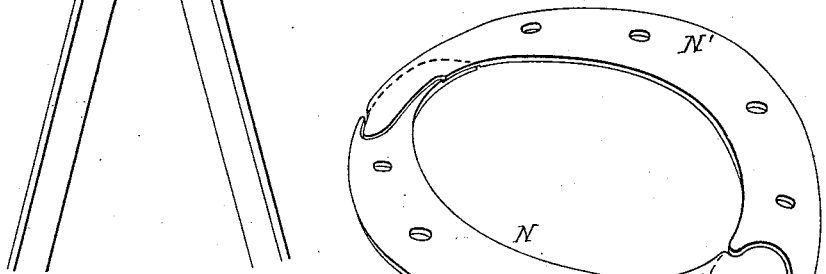
Witnesses:
Henry Bossert.
E. A. Happersett
Inventor:
George Rehfuss
by his Attorneys, Howson & Son

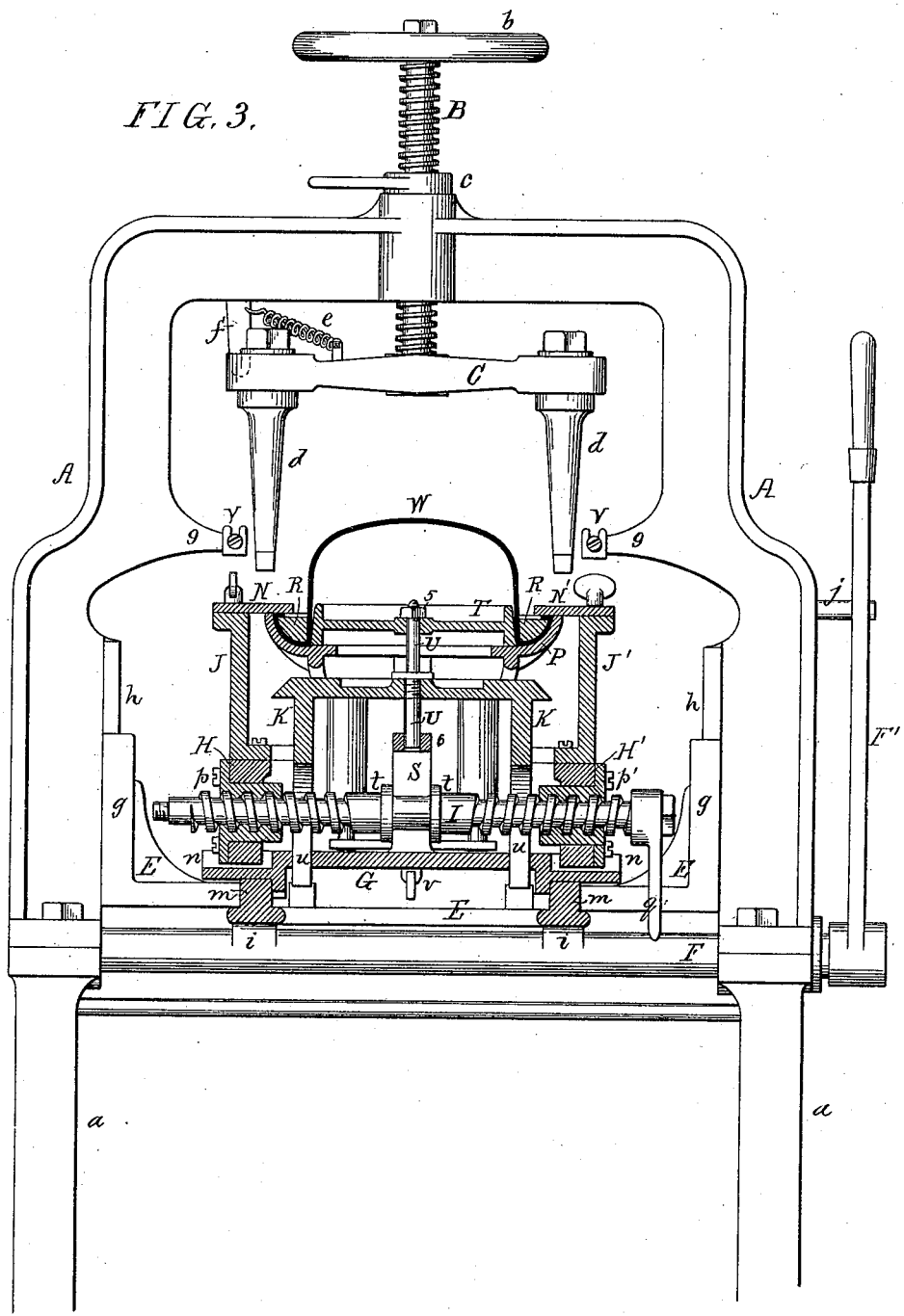

(No Model.) 3 Sheets—Sheet 3.
G. REHFUSS.
MACHINE FOR SHAPING AND CURLING HATS.
No. 319,747. Patented June 9, 1885.
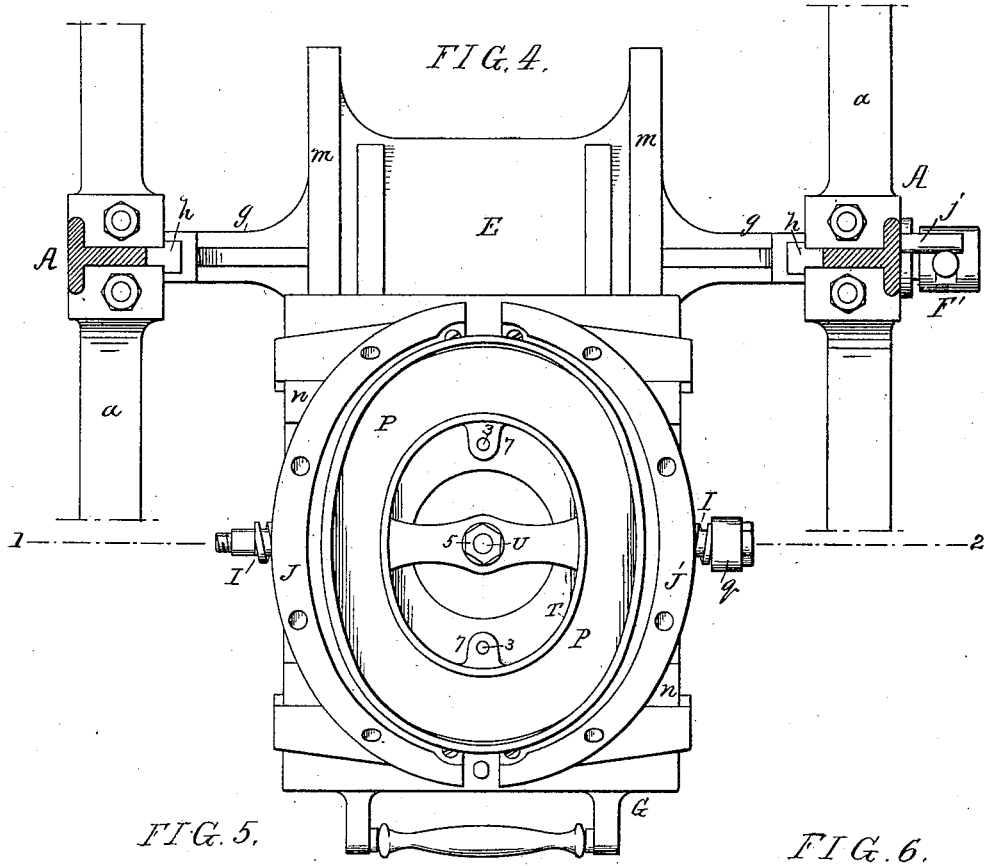
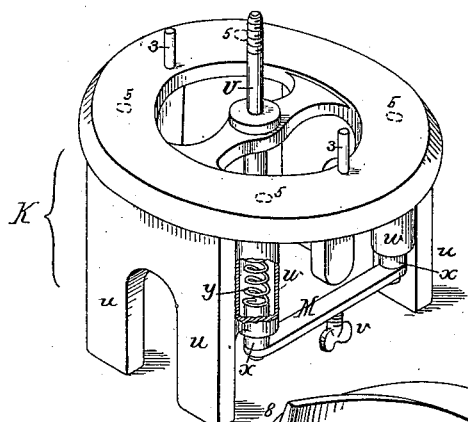
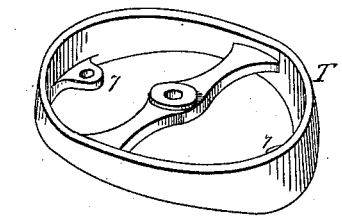
Witnesses:
Henry Bossert.
G. H. Happersett
Inventor
George Rehfuss
by his Attorneys
Howson & Sons

UNITED STATES PATENT OFFICE.

GEORGE REHFUSS, OF PHILADELPHIA, PENNSYLVANIA, ASSIGNOR TO EVAN MORRIS, OF SAME PLACE.

MACHINE FOR SHAPING AND CURLING HATS.

SPECIFICATION forming part of Letters Patent No. 319,747, dated June 9, 1885.

Application filed February 9, 1885. (No model.)

*To all whom it may concern:*

Be it known that I, GEORGE REHFUSS, a citizen of the United States, and a resident of Philadelphia, Pennsylvania, have invented certain Improvements in Machines for Shaping and Curling Hats, of which the following is a specification.

My invention consists of certain improvements, described and claimed hereinafter, in the machine for shaping and curling hat-brims, for which Letters Patent No. 262,479 were granted to Thomas Rowbotham, August 8, 1882.

In the accompanying drawings, Figure 1 is a vertical section on the line 1 2, Fig. 4, of the machine for shaping and curling hat-brims with my improvements; Fig. 2, a detached perspective view of part of the curling-plates; Fig. 3, a vertical section on the line 3 4, Fig. 1; Fig. 4, a sectional plan on the line 5 6, Fig. 1; and Figs. 5, 6, 7, and 8, detached perspective views of parts of the machine.

The frame A is supported on suitable legs, $a$, and through the top of this frame passes a screw-spindle, B, furnished at the top with a hand-wheel, $b$, and provided with a handled jam-nut, $c$, for securing the screw to the frame after adjustment. To the lower end of the spindle is secured the cross-head C, to which are attached the pendent arms $d$ $d$, the object of the latter being explained hereinafter. A spring, $e$, connecting the cross-head C to the frame, and stops $f$ tend to maintain the said cross-head and its arms in the position shown in Fig. 3. A bed, E, (most clearly shown in Figs. 1 and 4,) has projections $g$ $g$, adapted to vertical guides $h$ on the frame of the machine, longitudinal rails $m$ $m$, which form part of the bed, resting on cams $i$ $i$ on a shaft, F, which has its bearings in the frame-work, and which is provided with a hand-lever, F', so that the operator by manipulating said lever can raise the bed and permit it to fall to an extent determined by a stop, $j$, on the frame, against which stop the hand-lever bears when the bed is at its lowest point. The plate G, resting on and guided by the said longitudinal rails $m$ $m$ of the bed, carries the mechanism to which my invention more especially relates, and which I will now proceed to describe. Two frames, H H', bear on the plate G, and are adapted to undercut guides $n$ $n$ on the frame, so that they can be moved to and fro transversely on the said plate, but can have no other movement independently of the same.

I is a screw-shaft, on one portion of which is cut a right-handed thread, and on the other portion a left-handed thread, one threaded portion being adapted to a nut, $p$, secured to the frame H, and the other threaded portion being adapted to a similar nut, $p'$, secured to the frame H'. This shaft I is furnished with a lever, $q$, by manipulating which the operator can move the frames H H' from or toward each other, for a purpose explained hereinafter. The shaft is retained in an unvarying longitudinal position by a slotted projection, S, on the plate G, the shaft being provided with collars $t$, one on each side of the said projection.

A casting, K, which I will term a "carrier," and which is shown most clearly in the perspective view, Fig. 5, has legs $u$ passing through and guided by slots in the plate G, and said carrier is supported by two set-screws, $v$ $v'$, Figs. 1 and 3, passing through the plate. This support, however, is not direct, for the carrier rests on four springs, $y$, contained in sockets $w$, one of these sockets being broken away in Fig. 5 to show one of the springs. A cross-bar, M, has two projections, $x$, one at each end, one projection entering one socket and the other projection entering another socket, the aforesaid springs being interposed between the projections and the carrier, and the cross-bar M bearing at its middle on one of the set-screws $v$, as shown in Fig. 5. There is another cross-bar, (not shown in this figure, but appearing in Fig. 1,) which bears on the other set-screw, $v'$, and which is combined with sockets and springs in the manner above described. It will thus be seen that the carrier rests at the four points (indicated by the dotted circles 5,) on four springs supported by two cross-bars and two screws, and can therefore yield to a limited extent at all points where these springs occur. The carrier K is steadied and guided by a pin, U, secured to and projecting from the carrier and passing through an orifice in a plate, 6, secured to the top of the slotted projection S of the plate G.

To the frame H is detachably secured an upper frame, J, and to the frame H' a similar frame, J'. A curling-plate, N, is secured to the frame J, and a curling-plate, N', to the frame J', these plates and their relation to each other being shown in the perspective view, Fig. 2.

On the under side of the lower former, P, (shown in Fig. 8,) are ribs or projections 2, which bear on the top of the carrier, pins 3 on the latter (shown in Fig. 5) passing through the said former, and serving to maintain the same in a proper position. The upper former, Fig. 7, is composed of two parts, R R', which are not connected together; but a pin, 4, in one part fits loosely in an orifice in another part. This former is entirely detached from the machine, and is applied in the manner explained hereinafter. There is a third former, T, which rests on the lower former, P, and through which passes the pin U, screwed into the carrier K, as described, and above the former T the pin is provided with a nut, 5. The former T is also steadied by the above-mentioned pin 3, attached to the carrier and passing through lugs 7 on the said former.

Operation of the machine: The rim of one hat having been formed and curled, the operator slides the plate G and the mechanism carried by the plate on the bed B to the position shown in Fig. 1, after which, by manipulating the lever $q$, he moves the frames J J', and consequently the curling-plates N N', outward and clear of the curled rim of the hat W. He then removes the upper former, R R', and finally withdraws the hat from the former P and inner former, T. A crude hat is then adjusted over the inner former, and a portion of it, which has to form the rim, is pressed over the hat and adjusted to that portion of the same which has been applied to the lower former. The lever $q$ is then so operated that the frames J J' will be moved simultaneously toward each other, the curling-plates N N' turning over a portion of the hat onto the former R R', and after this the whole of the mechanism is moved to a position beneath the frame, and the operator turns the cross-head C to a position at right angles to that shown in Fig. 1, so that the pendent arms $d\ d$ will be directly above the V-shaped spaces 8, between the two parts of the formers R R', Fig. 7. By operating the lever F' the bed E and the entire mechanism carried thereby are elevated, the former R R' brought under the influence of the lower ends of the arms $d\ d$, which have such a wedge-like action on the two parts of the said former as to force them apart, and the rim portion of the hat being at the same time pressed between the former R R' and the curling-plates N N'. These plates are necessarily made of thin metal and have a tendency to buckle when the two parts of the former R R' are acted upon. In order to prevent this, I secure to projections $g\ g$ on the frame, Fig. 3, small vertically-adjustable blocks V, so that when the entire mechanism is elevated, as described above, the curling-plates will be in contact, but not forcibly in contact, with said block, the latter preventing the bending upward of said plates. When the above operations have been completed, the bed is lowered, the cross-head C permitted to assume the position shown in Fig. 3, and the bed moved outward as before, and the hat with its finished rim is removed prior to a repetition of the above operation on another hat.

It should be stated that the hat is charged with shellac, and is in a heated condition when operated on in the manner described.

Many of the parts above referred to are to be found in the aforesaid patent, No. 262,479, to improvements in which my invention relates, the most prominent of the said improvements being that which permits me to detach the frames J J' and the devices carried thereby from the frames H H' without disturbing the latter, the carrier K, or screw-shaft I. The importance of this will be understood when it is remembered that the frames and curling-plates must be removed and replaced by others whenever hats of different shapes have to be operated on.

It will be observed, on reference to Fig. 2, that the overlapping ends of the plates N N' are recessed—one on the upper side and the other on the under side—so that the desired overlapping of the plates is effected without causing any offsets or shoulders on the under faces of the plates, these offsets or shoulders having a tendency to wrinkle or crease the brim of the hat.

I claim as my invention—

1. The combination of the plate G, frames H H', and mechanism for moving the same from or toward each other with the removable frames J J', carrying the curling-plate, substantially as described.

2. The combination of the carrier K, its elastic supports, and steadying-pin U with the frames P, T, and R, and mechanism for acting on the said frame R, substantially as set forth.

3. The combination of the bed E, mechanism for raising and lowering the same, the curling-plates N N', and supports for the same with blocks or stops V on the frames, substantially as described.

4. The combination of the curling-plates N N', having overlapping ends, recessed as described, so as to present a flat under surface, as set forth.

5. The combination of the formers with the carrier K, having at the corners elastic supports carried by bars M M, with central bearings, as set forth.

In testimony whereof I have signed my name to this specification in the presence of two subscribing witnesses.

GEORGE REHFUSS.

Witnesses:
HENRY HOWSON, Jr.,
HARRY SMITH.